June 23, 1942. J. G. M. BRODEN 2,287,548
VALVE CONTROLLING APPARATUS
Filed Oct. 31, 1938 6 Sheets-Sheet 1

Inventor.
John G. M. Broden.
Attorneys

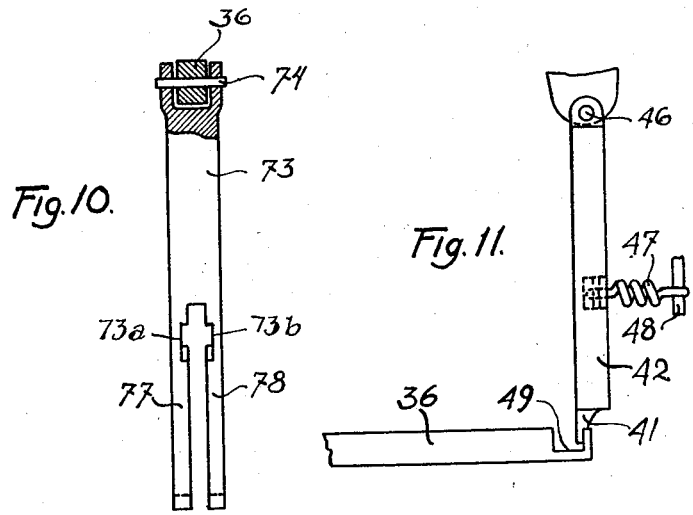
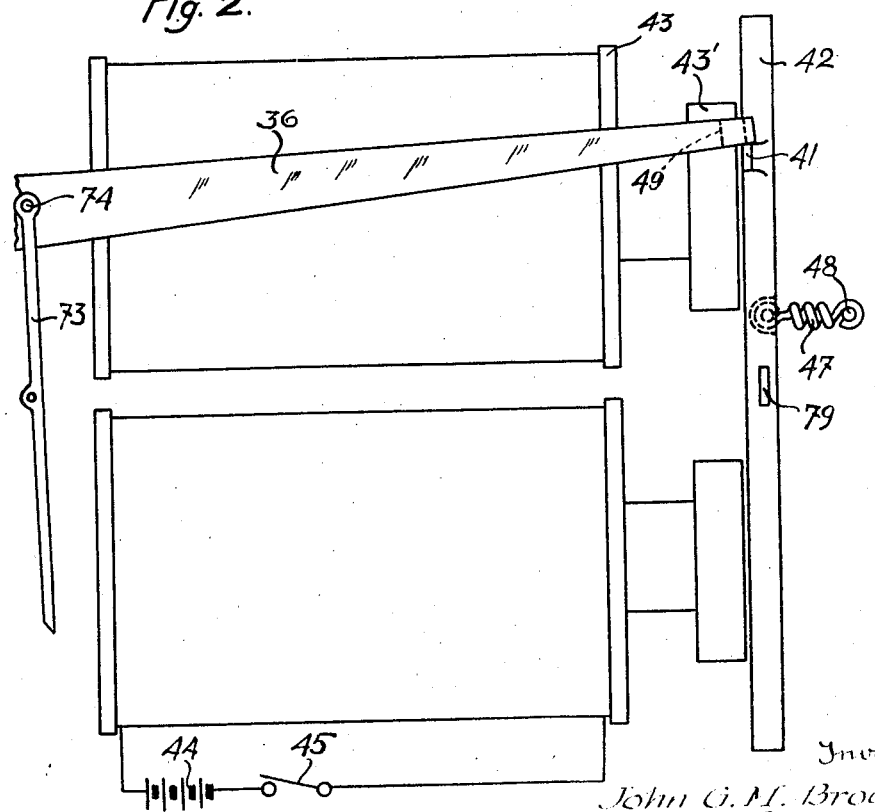

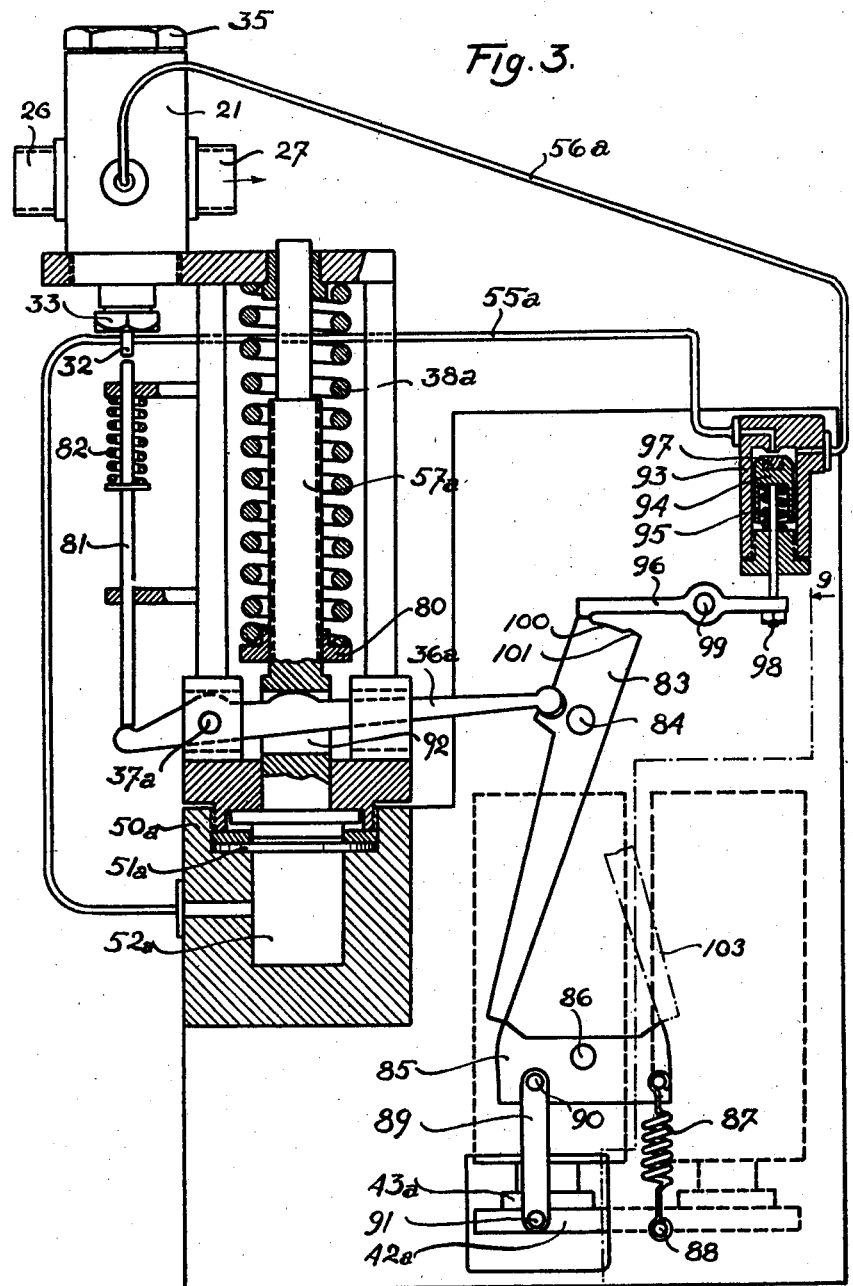

June 23, 1942.  J. G. M. BRODÉN  2,287,548
VALVE CONTROLLING APPARATUS
Filed Oct. 31, 1938  6 Sheets-Sheet 4
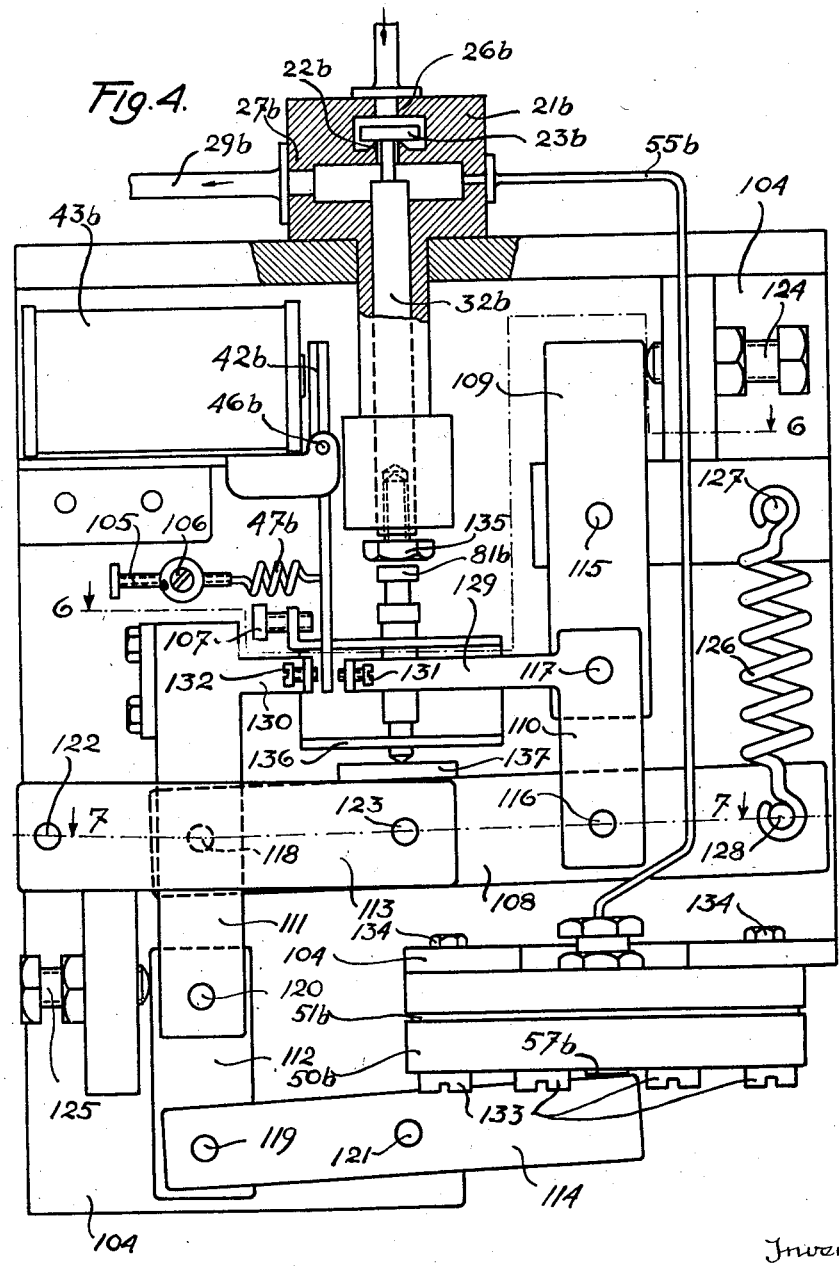
Inventor.
John G. M. Broden,
Cushman Darby Cushman
Attorneys

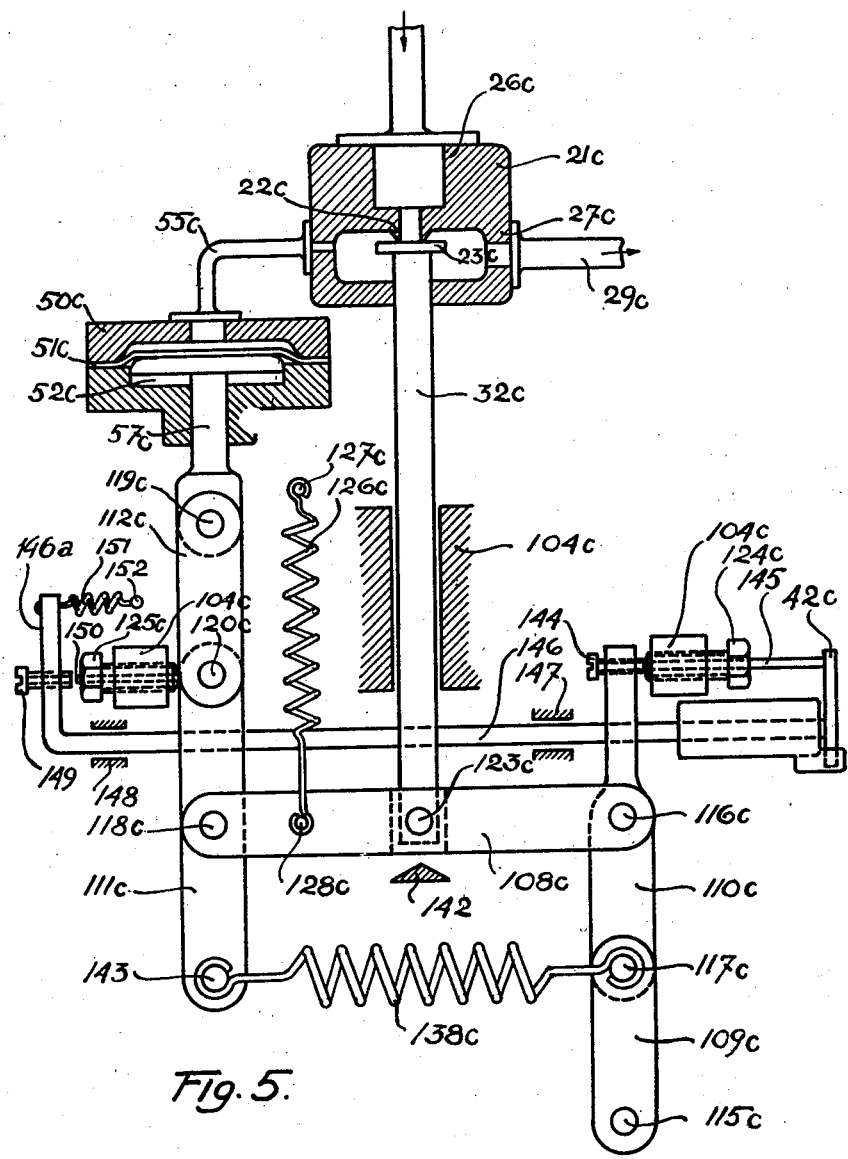

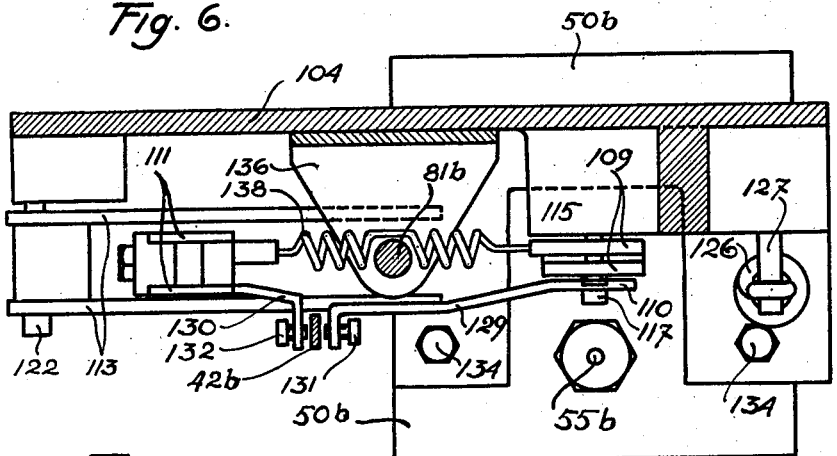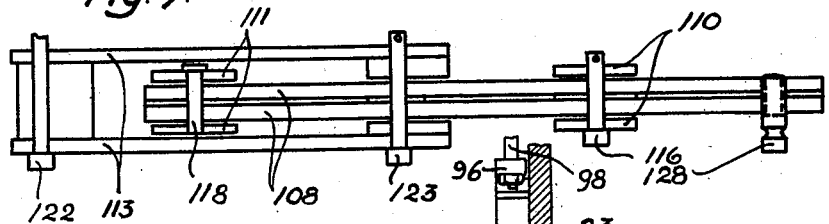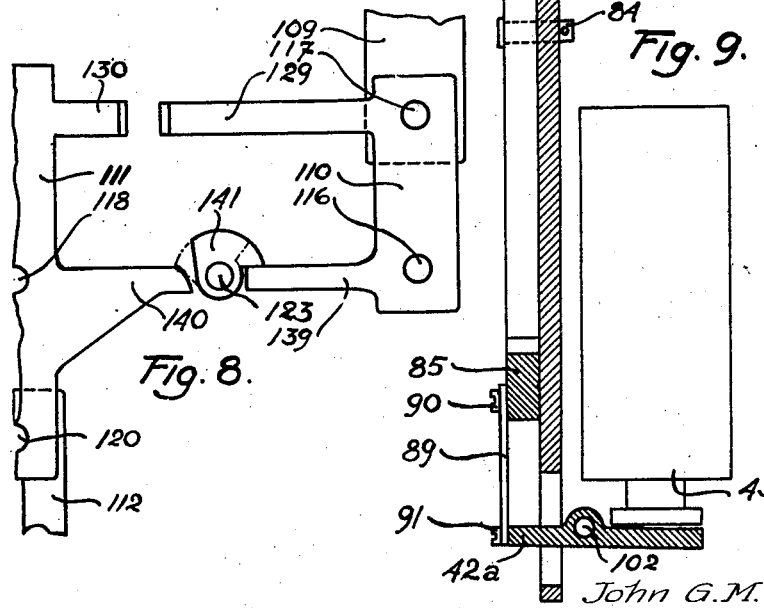

Patented June 23, 1942

2,287,548

UNITED STATES PATENT OFFICE 2,287,548

VALVE CONTROLLING APPARATUS

John Gustaf Mauritz Brodén, Malmo, Sweden, assignor to Kockums Mekaniska Verkstads, Aktiebolag, Malmo, Sweden, a corporation of Sweden Application October 31, 1938, Serial No. 238,114
In Sweden November 2, 1937

16 Claims. (Cl. 137—139)

The present invention relates to devices for opening and closing valve members for vessels containing compressed medium, such as air under pressure, in which the medium discharged through the valve member is employed for the actuation, for instance, of alarm apparatus of any desirable type, such as sirens.

It has previously been proposed to use the medium under pressure contained in the vessel as a source of power for effecting opening and closing of the valve member by the instrumentality of mechanism acted upon by the said pressure medium. Devices of this kind suffer, however, from the inconvenience that the vessel must be provided with more than one discharge opening, and, consequently, the medium under pressure has more than one place through which it may leak out from the vessel. This inconvenience is of particular importance in those cases in which the vessel must be kept under pressure for a long time without being used, so that it can occur, under unfavorable conditions, that the vessel is emptied when it should suddenly be used. Endeavours should therefore be made to provide the vessel with one discharge opening only, thus warranting the greatest possible security against self-emptying and making unnecessary a repeated inspection of the contents of the vessel. This inspection may be rather troublesome if the vessel is located at a remote or inaccessible place, or on account of other difficulties connected with the inspection. Vessels of the kind referred to are often operated from remote places.

The primary object of the present invention is to avoid the above named inconvenience and to provide an actuating and controlling device for the valves of the said vessels, which actuating device should be so constructed that upon opening of the valve it will be able to actuate the mechanism for the valve by means of the pressure of the medium prevailing on the outlet side of the valve, in a manner such that upon discharge of a certain quantity of medium under pressure said mechanism will move back to a position in which the whole assembly again is ready to effect a new opening of the valve.

Other objects and advantages of the invention will be apparent from the following description of several embodiments illustrated in the accompanying drawings in which:

Figs. 1 and 2 illustrate an arrangement according to the invention, the vessel for the medium under pressure being not shown; Fig. 1 is the left-hand portion and Fig. 2 is the right-hand portion of the assembly, which is shown partly in section.

Fig. 3 is another embodiment of the invention, partly shown in section.

Fig. 4 is a further embodiment of the invention, also partly shown in section.

Fig. 5 is a still further embodiment of the invention, also partly shown in section.

Fig. 6 is a horizontal section taken on the line 6—6 of Fig. 4.

Fig. 7 is a section taken on the line 7—7 of Fig. 4.

Fig. 8 shows a modification of a detail of the embodiment illustrated in Fig. 4.

Fig. 9 is a partial section taken on the line 9—9 of Fig. 3.

Fig. 10 is a detail of the embodiment shown in Fig. 1, viewed from the right, and Fig. 11 shows some details of Fig. 2, viewed from above.

Figure 1:
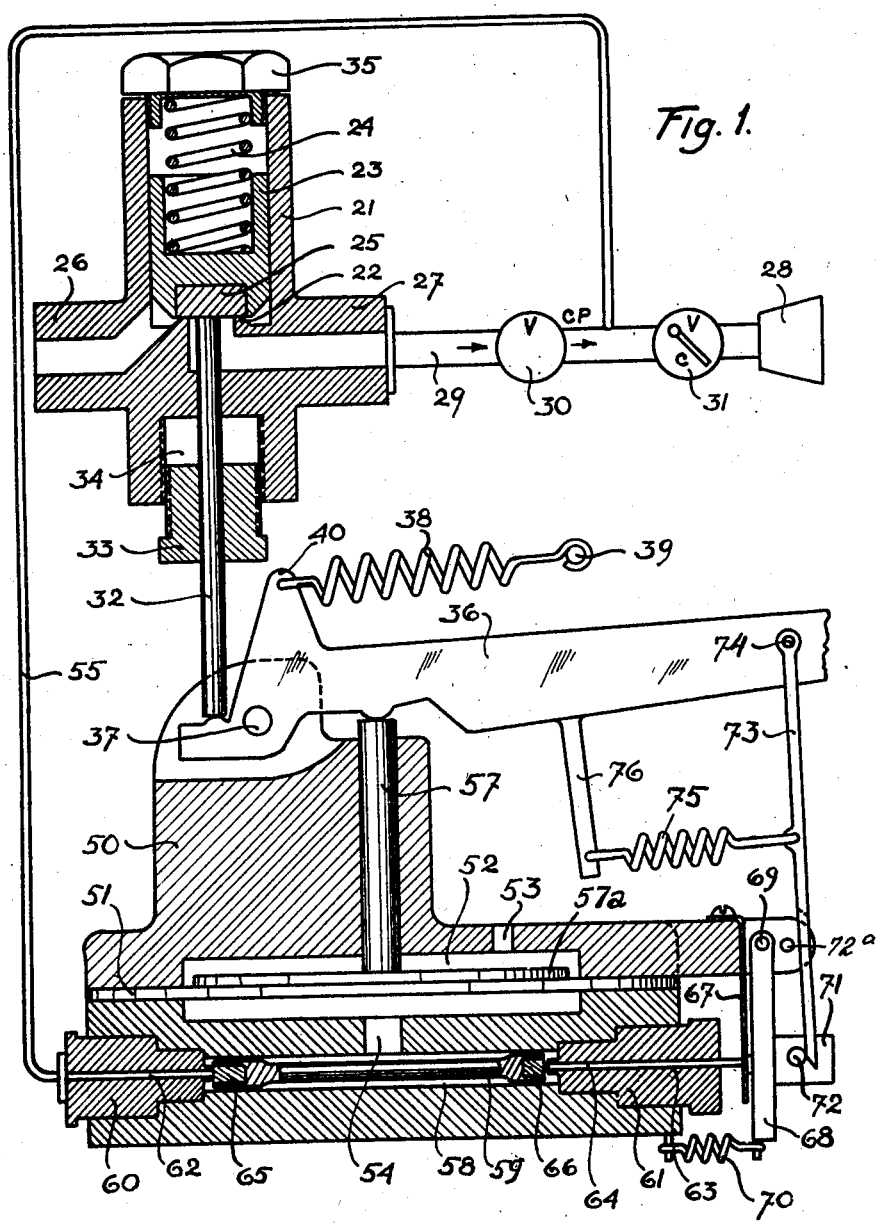

The embodiment illustrated in Figs. 1 and 2, comprises a valve casing 21 having a valve seat 22 against which a valve body 23 in the form of a piston is tightly pressed by means of a helical spring 24. The piston 23 is provided with a packing 25 of soft material. The valve casing is provided with an inlet branch 26 for connection with the vessel (not shown in the drawings) and with an outlet branch 27 for connection with an alarm apparatus diagrammatically indicated at 28. The vessel may be of any suitable type and forms per se no part of this invention. Between the outlet branch 27 and the alarm apparatus there is inserted an outlet conduit 29 containing a pressure reduction valve 30, which is arranged to maintain constant the pressure on the outlet side of the valve 23, and a safety valve 31 adapted to prevent undue rise of pressure if the reduction valve 30 should fail to operate. The valve body 23 is further acted upon by a rod 32 which extends into the valve casing through a gland 33 and a packing 34. The rod 32 is movable in its longitudinal direction and acts upon the valve body on the low pressure side thereof. The spring 24 is adjustable by means of a nut 35.

The rod 32 can be actuated by an arm of a three-armed lever 36 pivotally mounted at 37. A releasable force in the form of a helical spring 38 keeps the lever 36 in contact against the rod 32. One end of the spring 38 is fixed on a pin 39 secured to the support of the apparatus, which is not shown in the drawing, whereas the other end of the spring is attached to the arm 40 of the lever 36. The third arm of the lever 36 normally rests on a stop 41 on an armature 42 of an electromagnet 43 having a pole piece 43'. The electromagnet is connected to a source of current 44 and provided with a switch 45. The armature 42 is pivoted on a pin 46 mounted in the support of the apparatus. The armature is subjected to the action of a spring 47, the one end of which is secured to a pin 48 likewise mounted in the support. Near the end of the arm which rests on the stop 41, the lever 36 has a recess 49 through which the stop 41 can pass under certain circumstances as will be described hereinbelow.

The lever 36 is further subject to the action of a diaphragm 51 arranged in a casing 50 and acted upon on the one side by the atmospheric pressure and on the other side by the pressure of the pressure medium prevailing on the outlet side of the valve 23, as viewed in the direction of flow of the medium. The casing 50 forms a chamber 52 which is divided into two parts by means of the diaphragm 51, the upper one thereof communicating with the atmosphere through an opening 53 in the wall of the casing, and the lower one communicating with the outlet conduit 29 by means of an aperture 54, a control member to be described later on and a conduit 55. Normally, the conduit 55 is connected to the conduit 29 at a place between the pressure-reducing valve 30 and the safety valve 31, as is shown in Fig. 1. The movement of the diaphragm 51 is transmitted to the lever 36 by means of a rod 57, the lower end of which is connected with the diaphragm by means of a disk-like member 51a. The above-named control member between the diaphragm and the valve 23 consists of a double-seated valve having a stem 59 adapted to move to and fro in a cylindrical bore 58 provided in the casing of the diaphragm. The said bore is directly connected with the aperture 54. At both ends of the bore 58 plugs 60 and 61 are provided having passages 62 and 63, respectively. The passage 62 communicates with the conduit 55 and the bore 58. A pin 64 is slidable in the passage 63, the clearance between the pin and the passage forming a connection between the bore 58 and the atmosphere. The inner ends of the plugs 60 and 61, which are located within the bore 58, form small seats adapted to cooperate with the respective ends of the valve stem 59, said ends being for this purpose provided with packings 65 and 66, respectively, consisting of soft material. At its outer end, the pin 64 is connected to a plate spring 67 which is secured to the casing 50 and tends to move the pin to the right as viewed in Fig. 1. A swingable member 68 is pivoted about a pin 69 secured to the casing 50 and is loaded at its free end by means of a spring 70 which tends to force the swingable member 68 against the plate spring 67. The swingable member is provided with a projection 71 through which extends a pin 72 so as to project on both sides thereof. The lever 36 carries a swingable bifurcated arm 73 pivoted on a pin 74 which is secured to the lever 36 (see also Fig. 10). The bifurcated arm is acted on by a spring 75 which is inserted between a projection 76 of the lever 36 and a point approximately in the middle of the arm 73. The said spring 75 pulls the bifurcated arm against the projecting pin 72. The arm 73 is provided with two prongs 77 and 78, the ends of which are tapered as shown in the drawing. The slit between the prongs is sufficiently large to allow the projection 71 entering between the prongs, which normally rest against the projections of the pin 72. The slit between the prongs 77 and 78 is widened at its upper portion by oblique recesses 73a and 73b of such an extension that they permit the pin 72 passing through the slit to the other side of the arm 73. A pin 72a secured to the casing 50 is arranged to limit the movement of the arm 73 towards the left. The mode of operation of the embodiment described is as follows.

When the circuit is closed by means of the switch 45, the electromagnet 43 produces a small force which attracts the armature 42 (see also Fig. 11) so that the stop 41 is moved into the path of the recess 49 whereby the force constituted by the spring 38 will be released. The right-hand end of the lever 36, as viewed in Fig. 2, thereby moves downwards until it comes into contact with an abutment 79 on the armature 42. At the same time, the left-hand end of the lever 36 moves upwards and thereby lifts the rod 32 which opens the valve 23 against the resistance of the spring 24 with the result that medium under pressure is discharged from the vessel and flows to the apparatus 28 which begins to sound.

If, in order to stop the alarm apparatus, the current is then interrupted by means of the switch 45, the effect of the electromagnetic force ceases, and the armature 42 will be returned to its original position by the action of the spring 47. Thereby, the right-hand end of the lever 36 will be released from the abutment 79, and the releasable force represented by the spring 38 will be released once more, with the result that the valve member 23 will be lifted still more, while the right-hand arm of the lever 36 will be moved downwardly still farther.

During the first movement of the lever 36 after the first release, the prongs 77 and 78 of the bifurcated arm 73 are pressed against the projecting pin 72 so as to render ineffective, by means of the springs 75 and 70, the action of the plate spring 67 so that the pin 64 will be forced against the valve stem 59 which, consequently, will be kept in tight engagement against the passage 62. The medium under pressure in the pipe 55 is thus prevented from entering the bore 58 and the chamber 52, the diaphragm thus being kept out of action.

After the second release of the releasable spring 38, that is, when the right-hand arm of the lever 36 is moving downwards past the abutment 79, the bifurcated arm 73, too, moves downwards. When it reaches a certain position, the projecting pin 72 can pass into the recesses 73a and 73b of the prongs 77 and 78, whereby the action of the spring 75 upon the swingable member 68 ceases. The arm 73 then bears on the fixed pin 72a. The sum of the actions of the plate spring 67 and the pressure of the pressure medium on the valve stem 59 is now exceeding the action of the spring 70 so that the valve stem 59 will be moved to the right, as viewed in Fig. 1, and medium under pressure will enter the bore 58 and the space below the diaphragm. The valve 66 thereby closes the passage 63 and prevents discharge of medium under pressure therethrough. The diaphragm will be lifted under the action of the pressure medium and will thereby raise the rod 57 which will act on the lever 36 and move the right-hand arm thereof upwards. During the movement of the lever, its right-hand arm pushes the stop 41 out of the path of movement so that it can move past the same. At the same time, the releasable force represented by the spring 38 is tensioned, and the valve member 23 closes under the action of the spring 24. Due to the arrangement of the safety valve 31 a small quantity of pressure medium is retained in the outlet conduit, said quantity being sufficient to maintain the diaphragm under pressure until the armature 42 and its stop 41 have had sufficient time to return and to lock the lever 36 in its initial position. When the lever 36 moves upwardly past the stop 41, the bifurcated member 73 is also raised to such a height that its lower end passes the projecting pin 72. During the upward movement of the arm 73, the pin 72, due to the oblique recesses 73a and 73b, is moved to the right against the action of the spring 70. When the lower end of the arm 73 has passed the pin 72, this pin is returned by the spring 70. When the lever 36 thereupon again is lowered against the stop 41, the prongs 77 and 78 due to the tapered form of their ends will be moved to the right of the projecting pin 72. The force of the spring 75 then acts by means of the arm 73, on the pin 72 and the swingable member 68 and, consequently, upon the pin 64 which pushes away the valve stem 59 and thus permits the medium under pressure of being discharged through the clearance between the pin 64 and the wall of the passage 63. Thereupon, the various parts of the valve assembly are again ready for opening the valve 23 upon a new closing of the circuit by means of the switch 45.

The embodiment illustrated in Fig. 3 comprises a valve casing 21 which fully corresponds to the casing 21 shown in Fig. 1, though, for the sake of convenience, the valve is not shown in section. The rod 32 is arranged in the same manner and serves the same purpose as the rod 32 shown in Fig. 1. An outlet conduit 29, valves 30 and 31, and an alarm apparatus 28 are connected to the outlet branch 27 in the same way as in Fig. 1, although the said parts are not illustrated in connection with the present embodiment.

The releasable force represented by a spring 38a acts here on a lever 36a pivoted on a pin 37a which is mounted in the support of the assembly, which support forms no part of the invention and is not shown in the drawings. The spring 38a is inserted between the support of the assembly and a threaded ring 80 adjustable along a rod 57a which extends through the spring 38a. The lever 36a has two arms and acts with one of its arms and by means of a rod 81 on the rod 32 of the valve. The rod 81 is under the influence of a spring 82 which presses the rod in the direction against the lever 36a. The other arm of the lever 36a is pivotally connected to another lever 83 which is mounted on a pivot 84 secured in the support of the mechanism (see also Fig. 9). One end of the lever 83 is locked in its position by means of a member 85 which is pivotally mounted on a pin 86 secured to the support. One side of the member 85 is acted on by a spring 87 which is secured to a pin 88 mounted in the support. On its other side, the member 85 has pivoted to it a link 89 secured to the member 85 by means of a screw 90 and having its other end secured, by means of a screw 91, to an armature 42a of an electromagnet 43a. The lever 36a extends through a slot 92 in the rod 57a. The lower portion of this rod is acted on by pressure medium taken from the outlet side of the valve 21 and acting on a diaphragm 51a arranged in a casing 50a having a chamber 52a which is divided into two parts. The casing of the diaphragm is made in two parts between which the diaphragm is inserted. The lower end of the rod 57a rests against the diaphragm in one of the parts of the chamber 52a. The other side of the diaphragm communicates with the pressure medium by means of the chamber 52a and a conduit 55a which is connected to the pressure medium through a control device. This control device comprises a cylinder 93 and a piston 94 which is under the action of a spring 95 and a lever 96. The one end of the piston is provided with a packing 97 which in the one end position of the piston tightly abuts against and closes the opening which connects the conduit 55a with the cylinder 93. A conduit 56a which is connected to the valve casing 21 at the outlet side of the valve body also communicates with the cylinder 93. By means of a rod 98, the piston 94 is connected with one arm of the lever 96 which is pivoted on a stationary pin 99. The other arm of the lever 96 abuts against an arm of the lever 83, the end of said arm being in the form of a cam 100. The cam comprises a circular portion having the pivot 84 as a centre and projections 101 located on both sides of the circular portion. Although not shown in the drawing, the electromagnet is connected to a source of current and provided with a switch substantially in the same manner as shown and described with reference to Fig. 2.

The mode of operation is as follows. Upon closing of the circuit by means of the switch (not shown in the drawings) the electromagnet 43a attracts the armature 42a which thereby is turned about its pivot 102. The link 89 thereby turns the member 85 about the pin 86 so that the lever 83 will be unlocked and the releasable force represented by the spring 38a will be released so that the right-hand arm of the lever 36a will be moved downwards. The rod 81 will thus be raised and will move the rod 32 and thus also the valve body between the vesel and the alarm apparatus, as previously described with reference to Figs. 1 and 2. At the same time, the lever 36a acts upon the lever 83 so as to turn the latter around the pin 84 whereby the lower end of the lever 83 pushes away the right-hand end of the member 85 so that the lever 83 can be moved somewhat past the member 85, whereupon the said member returns and thereby prevents the lever 83 from moving back to the initial position. The rod 57a then abuts against the upper side of the diaphragm 51a. Upon release of the lever 83 the upper arm of will evidently also move through a corresponing angle about the pivot 84. The lever 96 which rests against the cam formed by the upper end of the lever 83 will thus turn about the pin 99 in accordance with the curvature of the cam portion of the lever 83. To begin with, the piston 94 will close the connection between the conduit 55a and the cylinder 93 and thereby prevent pressure medium from flowing from the conduit 56a to the lower side of the diaphragm 51a. Only after the cam has finished its turning movement, and the lever 83, consequently, is locked by the member 85 in the position indicated by the dash and dot lines 103, will the piston be returned so as to open the connection for the pressure medium which then can pass through the conduit 55a into the chamber 52a. The pressure acting against the lower side of the diaphragm raises the rod 57a and thus tensions the spring 38a again.

Upon opening of the circuit through the electromagnet the force exerted by the same ceases and the spring 87 releases the lever 83 by turning the member 85 in a clockwise direction. The spring 82 then acts against the lever 36a and the latter acts against the lever 83 so that the same will be returned to its initial position. The lever 83 thereby pushes away the left-hand portion of the member 85 which thereupon returns under the action of the spring 87 and locks the lever 83 in the new position thereof. Upon the downward movement of the rod 81 the valve member 23 is closed by the spring 24 (see Fig. 1) and the supply of pressure medium to the alarm apparatus ceases. The releasable force represented by the spring 38a is now tensioned again and the various parts of the assembly are in such positions as to be ready for a new opening of the valve member 23.

The embodiment of the invention illustrated in Figs. 4, 6 and 7 comprises a valve casing 21b connected to the vessel through an inlet 26b and provided with an outlet 27b to which there is connected an outlet conduit 29b having valves 30 and 31 (not shown in the present embodiment) and being connected to the alarm apparatus in the manner described in conjunction with the embodiment shown in Fig. 1. The valve body 23b in the present embodiment rests against the valve seat 22b with a tight fit under the action of the pressure medium only. An electromagnet 43b mounted on a support 104 is provided with an armature 42b pivoted on a pin 46b. The armature is in the form of a lever, the one arm of which serves for releasing certain forces, as will be more fully described hereinbelow. The armature is under the influence of a spring 47b adjustable by means of a screw 105 and an appertaining set screw 106. The movement of the armature is limited in the one direction by means of the electromagnet and in the other direction by means of an adjustable screw 107. A linkage comprising a horizontal link 108, two toggles 109, 110 and 111, 112 and links 113, 114 is arranged in the following manner. The toggle 109, 110 is adapted to pivot on a pin 115 mounted in the support. The link 110 is pivoted to the link 108 by means of the pin 116. The knee joint is formed by a pin 117. The link 111 is connected to the link 108 by means of a pin 118. The link 112 is pivotally connected to the link 114 by means of the pin 119. The knee joint of the last-named toggle is constituted by the pin 120. The link 114 is pivoted on the stationary pin 121. The link 113 is pivoted on a pin 122 mounted in the support and is connected to the link 108 by means of the pin 123. The toggle 109, 110 abuts in its stretched-out position against an adjustable screw 124 secured to the support, whereas the toggle 111, 112 abuts against another adjustable screw 125 likewise fastened in the support. The link 108 can be acted on by a releasable force represented by a spring 126 inserted between a pin 127 in the support and a pin 128 in the link 108. The links 110 and 111 are provided with arms 129 and 130, respectively, which are so located that they end a short distance from the armature 42b, on either side thereof. The arms 129 and 130 are provided with adjustable screws 131 and 132, respectively, for adjusting the distance between the arms and the armature. A conduit 55b connects the valve casing 21b at the outlet side of the valve member 23b with a chamber (not shown) in a diaphragm casing 50b. In the same manner as described with reference to the chamber 52 in Fig. 1, the corresponding chamber in the present embodiment is divided into two compartments separated by a diaphragm 51b. The conduit 55b is connected with the compartment located above the diaphragm. The latter is connected on its lower side with a rod 57b which extends through the diaphragm casing 50b and the outer end of which rests against the link 114. Also in the present embodiment, the diaphragm casing consists of two parts between which the diaphragm 51b is clamped by means of bolts 133. By means of bolts 134, the diaphragm casing is fastened to the support. In the present instance, the valve body 23b is secured to a rod 32b which extends through the valve casing 21b and the lower end of which is provided with an adjustable screw 135. In axial alignment with the rod 32b and at a short distance from the screw 135 there is arranged a rod 81b adapted to be displaced in axial direction and guided by a bracket 136 secured to the support 104. The lower end of the rod 81b rests against an abutment 137 connected to the link 108.

As will be seen from Fig. 6, the links 111 and 109 are connected with each other by means of a tension spring 138. The arrangement of the links is more clearly shown in Fig. 7. In order to render the link system more stable, it is provided with double links which partially overlap each other.

The mode of operation of the embodiment described is as follows. Upon closing of the circuit of the electromagnet which also in the present instance is connected to a source of current and a switch not shown in the drawing but arranged in the same manner as illustrated in Fig. 2, the armature 42b will be attracted so that its lower end will act on the adjustable screw 131 so as to move the toggle 109, 110, which initially was stretched out, out of its normal position. As a result thereof the links 109, 110 will be turned by the released force represented by the spring 126. On such turning of the toggle 109, 110, the spring 138 pulls the link 111 so that the knee joint of the toggle 111, 112 will be pressed against the adjustable screw 125. The toggle 111, 112 is then stretched out, and the pin 118 of the link 111 acts as a stationary pivot. Consequently, the releasable force represented by the spring 126 will turn the link 108 upwardly about the pin 118, whereby the rod 81b will be raised and brought into contact with the adjustable screw 135, so that upon continued upward movement the valve member 23b will be lifted, so as to open the communication between the vessel for the pressure medium, and the alarm apparatus. Medium under pressure then flows not only to the alarm apparatus but also through the conduit 55b into the upper compartment of the chamber within the diaphragm casing 50b. The pressure medium exerts a certain pressure on the diaphragm which transmits the said pressure to the rod 57b which thereby moves downwards the right-hand arm of the link 114, the left-hand arm of which moves the stretched-out toggle 111, 112 upwards which is rendered possible by a point of the link 108 now resting above the pin 123 against the rod 81b, the lower point of which now constitutes a fixed point of the system, since the adjustable screw 135 has been brought into contact with the lower portion of the valve casing 21b. The link 108 will consequently turn about the pin 123. At the same time the spring 126 representing the releasable force will be tensioned, the toggle 109, 110 will be almost stretched out, and the spring 138 will be released.

If the circuit of the electromagnet is then opened again, the armature 42b will be moved under the action of the spring 47b so as to act on the adjustable screw 132, with the result that the toggle 111, 112 will be moved out of its position of the equilibrium and the links 111 and 112 will be turned under the influence of the force exerted on the link 114 by the diaphragm 51b. The turning movement of the links 111, 112 again causes tension of the spring 138 which latter now moves the toggle 109, 110 into a stretched-out position and into contact with the adjustable screw 124. The pin 116 of the link 110 now constitutes a stationary pivot around which the link 108 is turned, said turning movement being facilitated by the released force of the spring 126. The abutment 137 follows the movement of the link 108 and, consequently, the rod 81b, too, will move downwards, with the result, that the pressure of the pressure medium will close the valve 22b, 23b. As a result thereof, the pressure exerted on the diaphragm 51b will be reduced and the force exerted on the link 114 will cease so that the spring 138 will tend to stretch out the toggle 111, 112 and move the same almost into contact with the adjustable screw 125. The spring 126 is now tensioned again and the link system is returned to its initial position so as to be ready to open the valve again upon closing of the circuit of the electromagnet.

In order to prevent a simultaneous turning movement of the toggles 109, 110 and 111, 112, the links 110 and 111 may be provided with arms 139 and 140 respectively, as shown in Fig. 8. The said arms are adapted to cooperate with a rotatable member 141 mounted on the pin 123 and shaped as shown in the drawings. In the position shown in Fig. 8, the toggle 111, 112 is freely movable about the knee joint 120 without the arm 140 being hindered by the member 141. In this case, the toggle 109, 110 is stretched out. Upon turning movement of the toggle 109, 110 the arm 139 turns the member 141 about the pin 123 in a counter-clockwise direction so that the said member will be moved into the position shown by dash-and-dotted lines and thereby prevent the toggle 111, 112 from being turned to any noticeable extent.

In the embodiment shown in Fig. 5, 21c indicates the casing of the valve, 26c the inlet and 27c the outlet of the valve, and 29c the outlet conduit through which pressure medium can be conducted to the alarm apparatus not shown in the drawing. As in the previous embodiments, valves 30 and 31 not shown in the drawing are provided in the conduit 29c for the same purpose as in the previous embodiments. The valve seat is denoted by 22c and the valve body by 23c. A conduit 55c is connected to the valve casing on the outlet side of the valve body 23c, counted in the direction of flow of the pressure medium. The valve body 23c is made in one piece with a rod 32c which passes through the wall of the valve casing and is guided through the support 104c. In the present embodiment, the position of the valve body relative to the valve seat is inverse as compared with the previous embodiments. Also in the present instance the operating mechanism consists of a link system comprising a horizontal link 108c and two toggles 109c, 110c and 111c, 112c. The lower end of the rod 32c is pivoted to the middle of the link 108c by means of a pin 123c. In alignment with the rod 32c and below the link 108c there is arranged a stop 142 forming an upwardly directed knife edge. The joint of the toggle 109c, 110c comprises a pin 117c, and the link 109c is pivoted about a pin 115c secured to the support. The link 110c is pivoted to the one end of the link 108c by means of the pin 116c. The joint of the toggle 111c, 112c is constituted by the pin 120c. The link 111c is pivotally connected to the link 108c by means of the pin 118c located on the opposite side of the pivot 123c as compared with the pin 116c. One end of a spring 126c is secured to a pin 127c mounted in the support. The other end of the spring is connected to the link 108c by means of a pin 128c. Between the toggles there is inserted a spring 138c, one end of which is pivoted to the link 111c by means of a pin 143, while the other end is secured to the pin 117c. The link 110c is provided with an adjustable screw 144 which abuts against an adjustable screw 124c mounted in the support 104c. Another adjustable screw 125c likewise mounted in the support 104c abuts against the knee joint of the toggle 111c, 112c. The link 112c is pivotally connected, by means of a pin 119c, with a rod 57c rigidly connected to a disk-like portion which abuts against a diaphragm 51c arranged in a diaphragm casing 50c. The said casing consists of two parts connected to each other and clamping the diaphragm therebetween. The chamber 52c in the diaphragm casing is divided into an upper and a lower compartment by means of the diaphragm. The upper compartment communicates with a conduit 55c, whereas the lower compartment is in communication with the atmosphere through the clearance between the rod 57c and the adjoining wall of the diaphragm casing.

Also in the present embodiment an electromagnet including a source of current and a switch is used for releasing a certain force by means of a minor force. For the sake of simplicity, only the armature 42c of the electromagnet is shown in Fig. 5. The armature is provided with a pin 145 which extends through a bore in the adjustable screw 124c such that, under certain circumstances, it can be brought into contact with the adjustable screw 144. The armature is further provided with a rod 146 which is adapted to be moved in axial direction together with the armature and which is guided in bearings 147 and 148 mounted in the support. The one end of the rod 146 is rigidly connected with the armature 42c, while the other end 146a is bent at right angles. The portion 146a carries an adjustable screw 149 adapted to be brought into contact with a pin 150 which is located in a bore of the adjustable screw 125c. In this way, the pin 150 can under certain circumstances be brought into contact with the toggle 111c, 112c. A spring 151 is inserted between a stationary pin 152 and the portion 146a and acts on the rod 146 in the direction opposite to the direction in which the electromagnet acts on the armature 42c.

The mode of operation of this embodiment is as follows. Upon closing of the current of the electromagnet the armature 42c is moved to the left as viewed in Fig. 5. As a result thereof, the pin 145 acts on the adjustable screw 144 so that the toggle 109c, 110c which previously was stretched-out will be turned with its knee joint to the right. The pressure of the medium in the vessel causes the valve body 23c to open, and the rod 32c will be moved downwards until the link 108c which turns about the pin 118c comes into contact with the stop 142. Medium under pressure then flows through the outlet conduit 29c to the alarm apparatus, and the latter begins to sound. When the knee joint 117c moves to the right, the spring 138c is tensioned and keeps the toggle 111c, 112c in engagement with the adjustable screw 125c. The toggle 111c, 112c is then in a stretched-out position. Pressure medium flows simultaneously from the outlet side of the valve body 23c through the conduit 55c to the upper diaphragm compartment and presses the diaphragm and the rod 57c downwards, said pressure being transmitted to the link 108c which rests against the stop 142 and moves about the pin 123c. Under this movement the spring 126c will be tensioned. Simultaneously, the toggle 109c, 110c is almost stretched out again and the spring 138c is released. The alarm apparatus continues to sound until the current of the electromagnet is opened. If this happens, the spring 151 moves the adjustable screw 149 into contact with the pin 150 which acts on the toggle 111c, 112c so as to move the knee joint to the right, partly due to the pressure acting on the diaphragm and partly due to the tension of the spring 126c. The spring 138c is thereby tensioned again and stretches entirely out the toggle 109c, 110c so that the adjustable screws 144 and 124c will be brought into contact with each other. The pin 116c thus will form a stationary pivot and the link 108c will turn upwardly round the pivot 116c and thereby raise the rod 32c which closes the valve 22c, 23c so as to interrupt the supply of pressure medium to the alarm apparatus. When the pressure above the diaphragm is reduced, the spring 138c will stretch out the toggle 111c, 112c into an almost straight position. The releasable force represented by the spring 126c and the whole link system are then again returned into their initial positions in which they are ready again to cooperate with each other, upon closing of the circuit of the electromagnet, for opening the valve between the vessel and the alarm apparatus.

What I claim is:

1. A valve device for controlling the flow of pressure medium in a conduit, comprising valve means, actuating means for operating the valve means, a releasable stop mechanism for normally maintaining the actuating means in position with the valve means closed, restoring means operatively associated with said actuating means for restoring the valve means, means communicating the restoring means with the pressure medium supplied to the valve means for actuating the restoring means, means independent of the pressure medium for actuating said releasable stop mechanism, and a second releasable stop mechanism cooperating with said actuating means for stopping the valve means in position with the valve means opened, said restoring means cooperating with said second stop mechanism so as to bring about the restoring of the valve means to its closed position upon release of said second stop mechanism.

2. A valve device for controlling the flow of pressure medium in a conduit, comprising valve means, actuating means for operating the valve means, a releasable stop mechanism for maintaining the actuating means in position with the valve means closed, restoring means operatively associated with said actuating means for restoring the valve means, means communicating the restoring means with the pressure medium supplied to the valve means for actuating the restoring means, means independent of the pressure medium for actuating said releasable stop mechanism, a second releasable stop mechanism acting upon the actuating means for stopping the same in position with the valve means opened and cooperating with said restoring means so as to bring about the restoring of the valve means to its closed position upon release of said second stop mechanism, and means for connecting said stop mechanisms with each other.

3. A valve device for controlling the flow of pressure medium in a conduit, comprising valve means, a movable member for moving said valve means, power accumulating means for actuating said movable member, a releasable stop mechanism for maintaining said movable member in position with the valve means closed, restoring means operatively associated with said movable member and with said power accumulating means for restoring the valve means, means communicating the restoring means with the pressure medium supplied to the valve means for actuating the restoring means, means independent of the pressure medium for actuating said releasable stop mechanism, and a second releasable stop mechanism cooperating with said movable member for stopping the same in position with the valve means opened, said restoring means cooperating with said second stop mechanism so as to bring about the restoring of the valve means to its closed position upon release of said second stop mechanism.

4. A valve device for controlling the flow of pressure medium in a conduit, comprising valve means, actuating means for operating the valve means, a releasable toggle mechanism connected with the actuating means for maintaining the same in position with the valve means closed, restoring means operatively associated with said actuating means for restoring the valve means, means for communicating pressure medium to said restoring means for actuating the same, and a second releasable toggle mechanism operatively connecting said actuating means with said restoring means for restoring said actuating means after release of the first mentioned toggle mechanism and for stopping the valve means in position with said valve means opened until the release of the second toggle mechanism whereby the actuating means and the valve means are returned to closing position.

5. A valve device for controlling the flow of pressure medium in a conduit, comprising valve means, a movable member for moving said valve means, power accumulating means for actuating said movable member, a releasable toggle mechanism connected with said movable member for maintaining the same in position with the valve means closed, restoring means operatively associated with said movable member and with said power accumulating means for restoring the valve means, means for communicating pressure medium supplied to said restoring means for actuating the same, and a second releasable toggle mechanism connecting said movable member with said restoring means for transmitting power to restore said movable member and said power accumulating means after release of the first mentioned toggle mechanism and for stopping the valve means in position with said valve means opened until the release of the second toggle mechanism, whereby said movable member and the valve means are returned to closing position.

6. A valve device for controlling the flow of pressure medium in a conduit, comprising valve means arranged to open against the pressure acting thereon, a movable member for moving said valve means, power accumulating means for actuating said movable member to open the valve means, a releasable toggle mechanism connected with said movable member for maintaining the same and the power accumulating means in position with the valve means closed, restoring means operatively associated with said movable member and with said power accumulating means, means communicating pressure medium to said restoring means for actuating the same, and a second releasable toggle mechanism operatively connecting said movable member with said restoring means for transmitting power to reset said power accumulating means after release of the first mentioned toggle mechanism and for stopping the valve means in open position until release of the second toggle mechanism whereby said valve means is closed.

7. A valve device for controlling the flow of pressure medium in a conduit, comprising valve means being arranged to open against the pressure acting upon the valve means, a movable member for moving said valve means, power accumulating means for actuating said movable member to open the valve means, a releasable toggle mechanism connected with said movable member for maintaining the same and the power accumulating means in position with the valve means closed, restoring means operatively associated with said movable member and with said power accumulating means, means communicating pressure medium to said restoring means for actuating the same, a second releasable toggle mechanism operatively connecting said movable member with said restoring means for transmitting power to reset said power accumulating means after release of the first mentioned toggle mechanism and for stopping the valve means in position with the valve means opened until release of the second toggle mechanism whereby said valve means is closed, and spring means connecting the toggle mechanisms with each other for restoring the same after release.

8. A valve device for controlling the flow of pressure medium in a conduit, comprising valve means being arranged to open in the same direction as the direction of the pressure acting upon the valve means, a movable member for moving said valve means, a stop for limiting the opening movement of said movable member, power accumulating means for actuating said movable member to close said valve means, a releasable stop mechanism for maintaining said movable member in position with the valve means closed, restoring means operatively associated with said movable member and with said power accumulating means, means communicating pressure medium to the restoring means for actuating the same, and a second releasable stop mechanism connecting said retsoring means with said movable member for setting said power accumulating means and for maintaining the same and the movable member in position with the valve means opened until release of the second stop mechanism whereby the movable member is moved by said power accumulating means and the valve means closed.

9. A valve device for controlling the flow of pressure medium in a conduit, comprising valve means being arranged to open in the same direction as the direction of the pressure acting upon the valve means, a movable member for moving said valve means, a stop for limiting the opening movement of said movable member, power accumulating means for actuating said movable member to close said valve means, a releasable toggle mechanism connected with said movable member for maintaining the same in position with the valve means closed, restoring means operatively associated with said movable member and with said power accumulating means, means communicating pressure medium to said restoring means for actuating the same, a second releasable toggle mechanism connecting said restoring means with said movable member for transmitting power to set said power accumulating means and for maintaining the same and the movable member in position with the valve means opened until release of the second toggle mechanism whereby the movable member is moved by means of said power accumulating means and the valve means closed, and spring means connecting the toggle mechanisms with each other for restoring said mechanisms after release.

10. A valve device as claimed in claim 1, wherein said actuating means consists of a movable member and a spring device acting upon said movable member.

11. A valve device as claimed in claim 3, wherein said power accumulating means consists of a spring device.

12. A valve device as claimed in claim, 1, including adjustable supporting means cooperating with said releasable toggle mechanisms for maintaining the same in position ready for release.

13. A valve device as claimed in claim 4, including adjustable supporting means cooperating with said releasable stop mechanisms for maintaining the same in position ready for release.

14. A valve device as claimed in claim 1, including electromagnet means arranged to actuate said releasable stop mechanisms so as to release the first mentioned stop mechanism upon the closing of the circuit for said electromagnet means and to release said second stop mechanism upon breaking said circuit.

15. A valve device as claimed in claim 4, including electromagnet means arranged to actuate said releasable toggle mechanisms so as to release the first mentioned toggle mechanism upon the closing of the circuit for said electromagnet means and to release said second toggle mechanism upon breaking said circuit.

16. A valve device as claimed in claim 1 for controlling the flow of pressure medium in a conduit to an alarm apparatus, wherein said restoring means operated by pressure medium is connected with said conduit between said valve means and said alarm apparatus.

JOHN GUSTAF MAURITZ BRODÉN.